United States Patent
Birdsall

[15] 3,700,283
[45] Oct. 24, 1972

[54] MATERIAL CARRIER

[72] Inventor: Bert A Birdsall, Mondamin, Iowa 51557

[22] Filed: Aug. 10, 1970

[21] Appl. No.: 62,355

Related U.S. Application Data

[62] Division of Ser. No. 752,843, Aug. 15, 1968, Pat. No. 3,572,643, which is a division of Ser. No. 527,947, Feb. 16, 1966, Pat. No. 3,412,883.

[52] U.S. Cl..........................................298/7, 298/24
[51] Int. Cl. ...................................................B60p 1/36
[58] Field of Search ..............298/24, 18, 7; 296/280; 105/247, 248; 222/176, 185, 561; 193/2

[56] References Cited

UNITED STATES PATENTS

| | | |
|---|---|---|
| 2,827,204 | 3/1958 | McCurdy......................298/24 |
| 3,153,992 | 10/1964 | Dabelle......................193/2 X |
| 2,968,424 | 1/1961 | Lawson......................193/2 X |
| 2,573,714 | 11/1951 | Karl.............................298/7 |

Primary Examiner—Banjamin Hersh
Assistant Examiner—Robert R. Song
Attorney—Hofgren, Wegner, Allen, Stellman & McCord

[57] ABSTRACT

A material carrier movable over the ground and having wall structure of changing dimensions to provide an increasing dimension flow path to facilitate downward flow of material to a trough and discharge opening and with structure for tilting of the carrier relative to the supporting frame.

2 Claims, 8 Drawing Figures

INVENTOR
BERT A. BIRDSALL
By Hofgren, Wegner,
Allen, Stellman & McCord
ATTORNEYS Patented Oct. 24, 1972

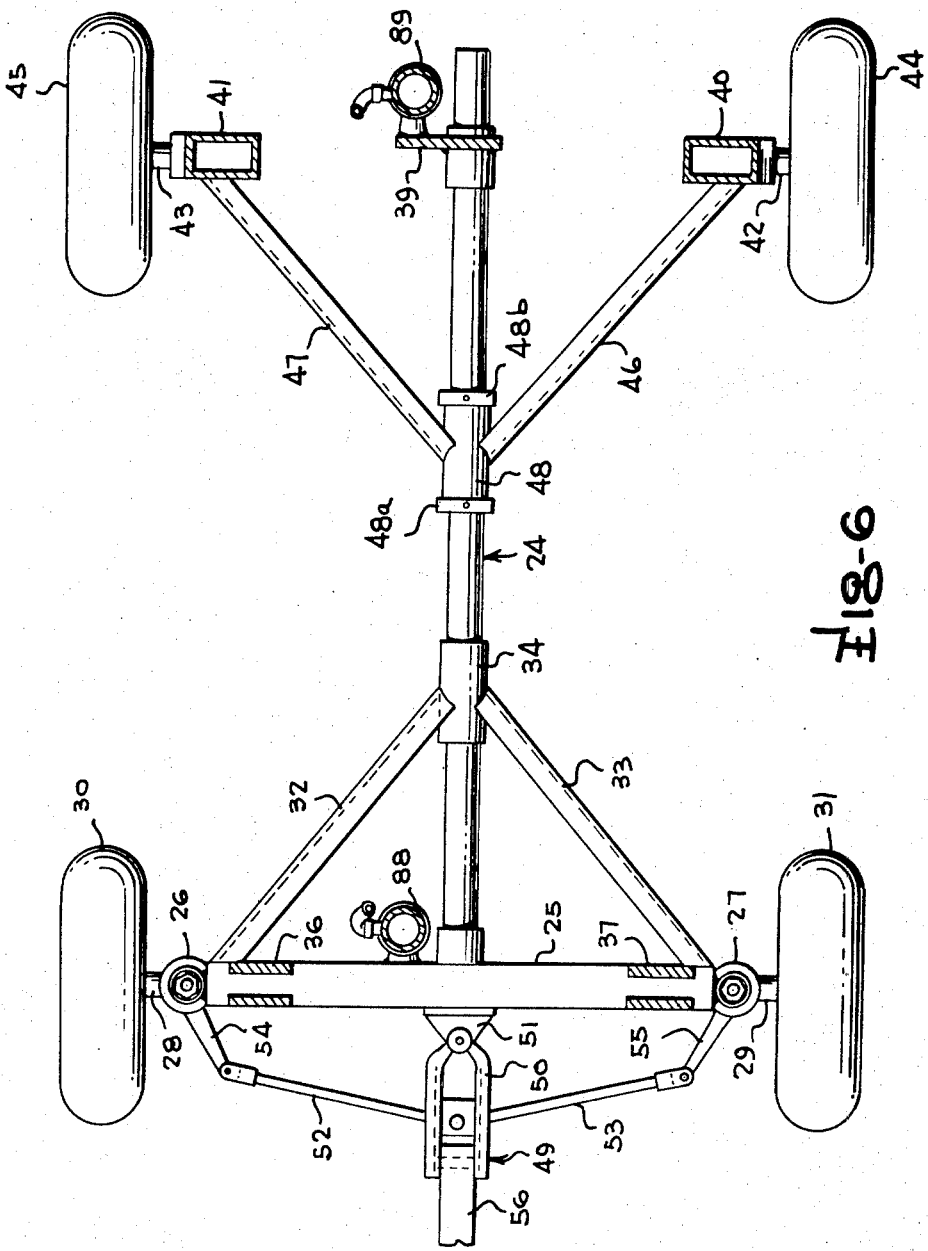

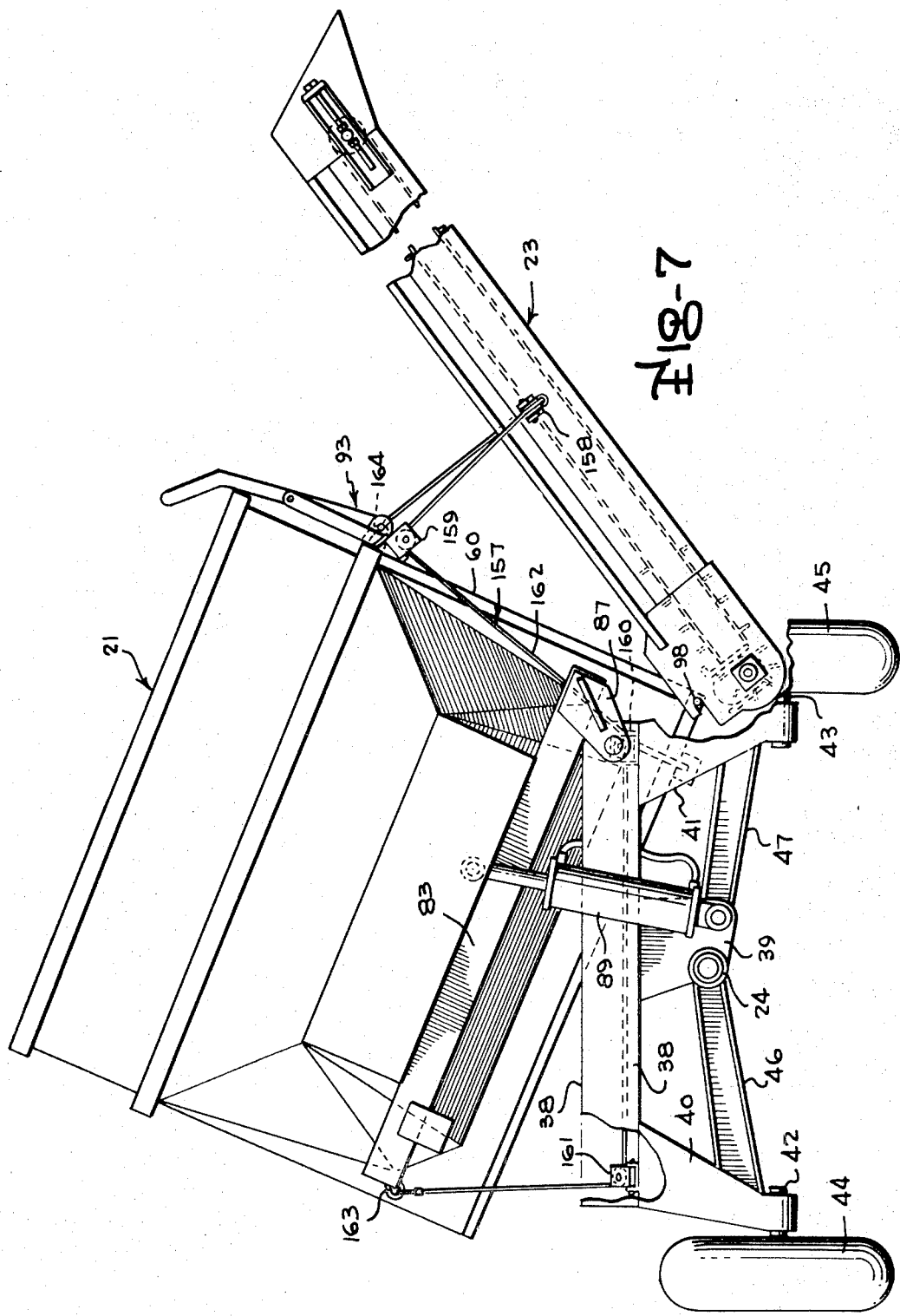

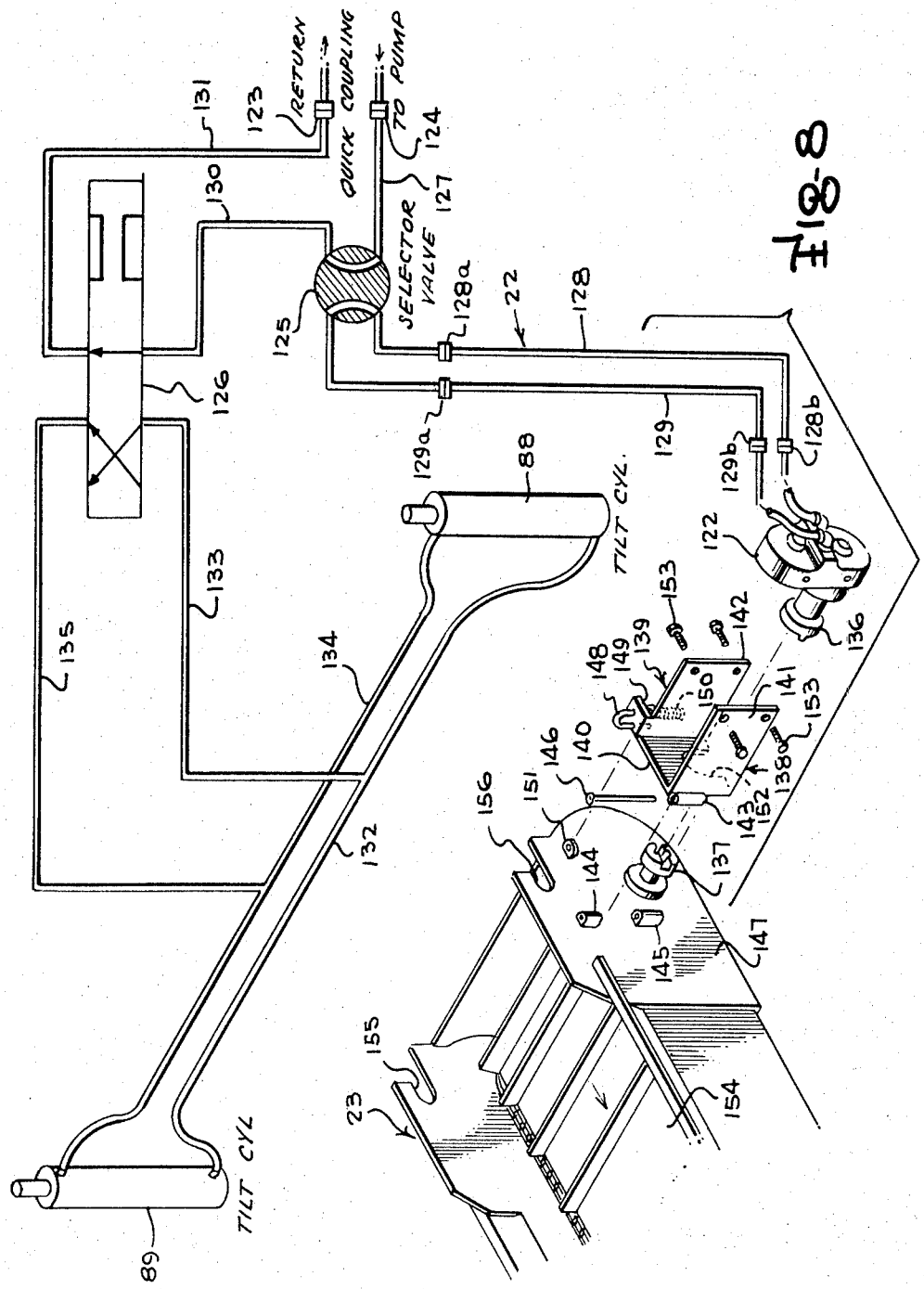

MATERIAL CARRIER

CROSS-REFERENCES TO RELATED APPLICATIONS

This application is a division of application Ser. No. 752,843, filed Aug. 15, 1968, now U.S. Pat. No. 35,726,43, and said prior application includes subject matter of application Ser. No. 527,947, filed Feb. 16, 1966, now U.S. Pat. No. 3,412,883.

BACKGROUND OF THE INVENTION

This invention relates to a material carrier usable about a farm and with different types of farm products providing for loading and unloading of the products.

The prior art known to applicant includes structures such as shown in Ray U.S. Pat. No. 710,611. Such a structure has a bottom wall with sloped sections. However, such construction does not facilitate movement of material to a exhaust trough, particularly where such materials are of a wet, moist nature. One example of such a material is green corn. Green corn or seed corn which is picked green, is heavy and while in travel in the carrier is jolted and tightly compacted. The ears of corn can bend around one another and become a solid mass bound together. The increasing dimensions of the flow path for the material in applicant's construction allow the ears to loosen and separate to facilitate discharge from the carrier.

SUMMARY OF THE INVENTION

An object of this invention is to provide a new and improved material carrier having a wall structure provided with sloped and inclined sections to facilitate discharge of the material from the carrier.

Still another object of the invention is to provide a material carrier as defined in the preceding paragraph wherein a pair of wall sections on opposite sides of a central trough are inclined downwardly from the front and rear walls of the carrier toward each other and are of progressively increasing width to increase the flow path of the material.

Still another object of the invention is to provide a material carrier wherein a carrier box is movably mounted on a carrier frame and cylinder means are connected between the box and the carrier axially for causing tipping of the box relative to the frame.

BRIEF DESCRIPTION OF THE DRAWING

FIG. 6 is a cross-sectional view taken along line 6—6 in FIG. 3;

FIG. 7 is a rear view of the embodiment illustrated in FIGS. 1 through 6, showing the container unit of the embodiment in the tilted position and a material handling apparatus attached to the embodiment for receiving material being discharged from the container unit; and FIG. 8 is a schematic diagrammatic view of the power supply system for the embodiment illustrated in FIGS. 1 through 7.

DESCRIPTION OF THE PREFERRED EMBODIMENT

Figure 1:
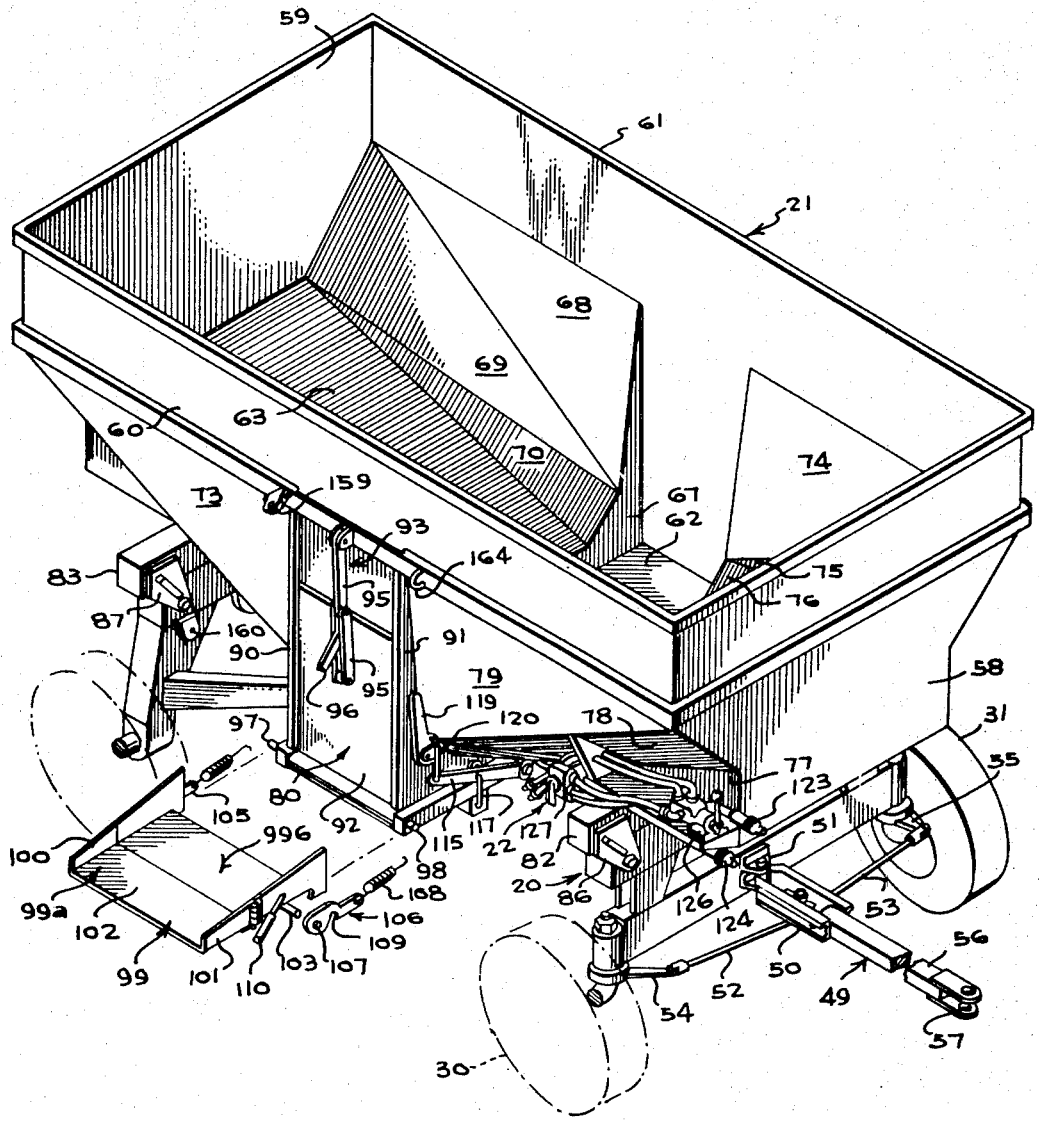
FIG. 1 is a perspective view of an embodiment of the invention.

While this invention is susceptible of embodiment in many different forms, there is shown in the drawings and will herein be described in detail an embodiment of the invention together with a modification thereof with the understanding that the present disclosure is to be considered as an exemplification of the principles of the invention and is not intended to limit the invention to the embodiments illustrated. The scope of the invention will be pointed out in the appended claims.

Briefly described, the present invention relates to a material carrier apparatus adapted for use with handling apparatus for loading and unloading material from the carrier apparatus generally comprising movable support means, material container means mounted on the support means, power supply means mounted on the container means, and portable prime mover means operatively connectable to the handling apparatus for operating the same, and operatively connected to the power supply means. More specifically in accordance with a preferred embodiment of the invention, the material carrier apparatus comprises a frame assembly mounted on wheeled units, a material container unit including front and rear walls, side walls, a bottom wall, a bottom discharge door and a side discharge door, with the bottom wall including wall sections inclined downwardly from the front and rear walls toward the discharge doors and the side walls including diverging wall sections extending from the front and rear walls toward the discharge doors for directing material by gravity flow toward the bottom discharge doors, a fluid supply system mounted on the container unit, a portable fluid motor operatively connectable to an attached or detached material handling apparatus for loading and unloading material from the container unit, and operatively connected to the fluid supply system, fluid actuated means for tilting the container unit and the fluid supply system including control means for selectively supplying fluid under pressure to the fluid motor and the tilting means, and additional control means for operating the tilting means.

Figure 2:
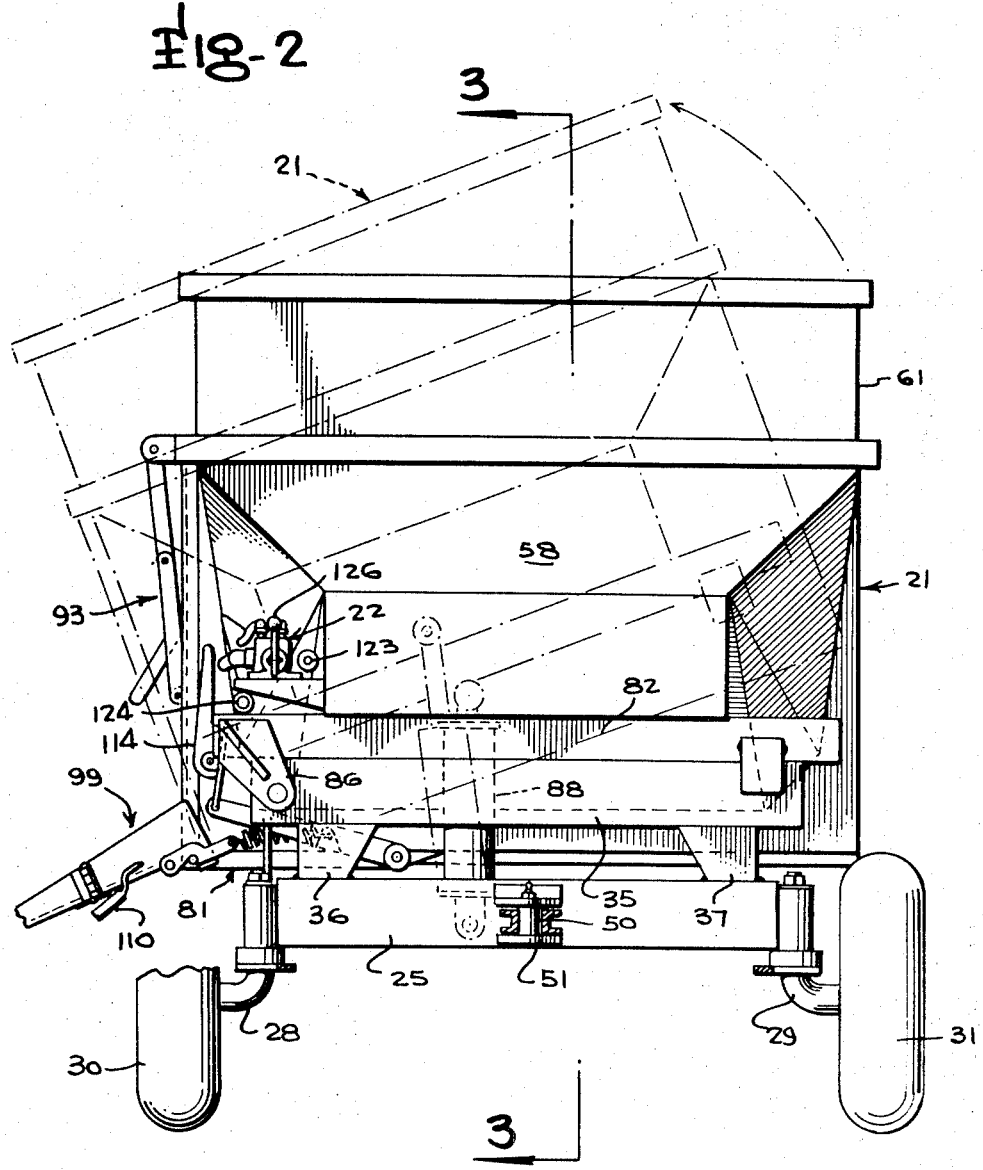
FIG. 2 is an enlarged front elevational view of the embodiment illustrated in FIG. 1, also illustrating the container unit of the embodiment in the tilted position in phantom lines.

Referring to the drawings, there is illustrated an embodiment of the invention. This embodiment generally includes a chassis or frame assembly 20, a container unit 21 mounted on the frame assembly and pivotally connected thereto so that it may be tilted transversely in a plane substantially normal to the longitudinal centerline of the frame assembly, and a power supply system 22 which is operable to tilt the container unit and operate an attached or detached material handling apparatus, such as a flight conveyor 23, as best shown in FIG. 7. The frame assembly 20 is provided with a longitudinally disposed main cylindrical frame member 24. Mounted on the front end of the main frame member 24 is a transverse frame member 25 having bearing members 26 and 27 mounted on the lateral ends thereof. Journaled in the bearing members 26 and 27 are the upright portions of axle members 28 and 29 on which there are mounted front wheels 30 and 31. The transverse frame member 25 is rigidly secured to the main frame member 24 by means of brace members 32 and 33 interconnecting the ends of the frame member 25, and a collar member 34 rigidly secured to the main frame member. As best shown in FIG. 2, spaced above the transverse frame member 25 is a front bolster or container support member 35, which is rigidly secured to the transverse frame member 25 by means of spacer brackets 36 and 37.

As best shown in FIGS. 6 and 7, the rear end of the frame assembly is provided with a rear bolster or container support member 38 which lies in substantially the same horizontal plane as the front bolster member 35. The rear bolster member 38 is supported on the rear end of the main frame member 24 by means of an interconnecting bracket member 39. Depending downwardly from the lateral ends of the rear bolster member 38 are leg members 40 and 41, having axle members 42 and 43 journaled in the lower ends thereof. The axes of the axle members 42 and 43 lie in substantially the same horizontal plane as the axle portions of axle members 28 and 29. The rear wheels 44 and 45 are mounted on the axles 42 and 43. The depending leg members 40 and 41 further are mounted on the main frame member 24 by means of brace members 46 and 47 interconnecting the depending leg members, and collar member 48 mounted in the main frame member 24. Collar member 48 is free to rotate on frame member 24 about the longitudinal axis thereof and is prevented from axial movement by means of rigidly mounted collar members 48a and 48b. This permits wheels 44 and 45 to easily negotiate uneven ground.

The carrier apparatus is adapted to be drawn by a tractor or other prime mover means by means of a draw bar assembly 49. The assembly 49 includes a linking member 50, which is pivotally connected to a bracket member 51 mounted on the front end of the transverse frame member 25, and which is pivotal in a horizontal plane. Pivotally connected to the linking member 50 are tie bars 52 and 53 which are connected at their outer ends to turning arms 54 and 55. The turning arms are rigidly secured to the upright portions of axle members 28 and 29. The draw bar assembly also includes a linking member 56 which is pivotally connected to the front end of linking member 50 for movement in a substantially vertical plane, and which is provided with a front end hitch 57 for connecting the carrier apparatus to the prime mover means.

The container unit 21 includes a front end wall 58, a rear end wall 59, side walls 60 and 61 and a bottom wall 62. The bottom wall includes bottom sections 63 and 64 which are inclined downwardly from the end walls 58 and 59 and terminate above horizontal bottom wall section 65 to provide opposing, transverse vertical wall sections 66 and 67. The inclined bottom wall sections 63 and 64 have a gradually increasing width as they extend from end walls 58 and 59 toward the bottom wall section 65. The lengths of the lower inner edges of sections 63 and 64 are greater than the length of the upper outer edges thereof. The rear end of the side walls 60 and 61 of the container unit are provided with side wall sections 68 through 73, which extend from the rear end wall 59 to the transverse vertical wall 67. The side wall sections 68 and 73 are inclined inwardly and downwardly, having side edges diverging from the rear corners of the container unit, and terminating at the transverse vertical wall 67. The side wall sections 70 and 71 are inclined inwardly and downwardly, having side edges diverging from the rear end wall 59 and terminating at the transverse vertical wall 67. The intermediate side wall sections 69 and 72 also are inclined inwardly and downwardly, adjoining side wall sections 68 and 70, and 73 and 71, respectively, so that any corners in the rear end of the container unit are eliminated.

The front end of the container includes side wall sections 74 through 79, which are substantially similar to side wall sections 68 through 73. The side wall sections 74 through 79 also eliminate any corners in the front end of the container unit. The configuration of the bottom wall sections 63 and 64 and the side wall sections 68 through 73, and 74 through 79 permit material disposed within the container unit to move by gravity flow toward the bottom wall section 65. In addition, the configuration of the side wall sections prevents material from becoming lodged in the corners of the container. The side wall 60 of the container unit is provided with a side discharge door assembly 80, and the bottom wall section 62 is provided with a bottom discharge door assembly 81, as will later be described.

The container unit 21 is supported on the bolster members 35 and 38 by means of transversely extending bolster members 82 and 83, which are secured to the inclined bottom wall sections 64 and 63 by means of vertical bracket members 84 and 85, respectively. The bolster members 82 and 83 are pivotally connected to the adjacent bolster members 35 and 38 by means of sets of linking arms 86 and 87, respectively, to permit the container unit 21 to be tilted in a transverse plane disposed substantially normal to the longitudinal centerline of the frame assembly. This permits material carried by the container unit 21 to flow toward the discharge door assemblies 80 and 81. The container unit 21 is tilted on the frame assembly by means of a front hydraulic cylinder 88 and a rear cylinder 89. The front cylinder is positioned adjacent the longitudinal centerline of the apparatus and is pivotally connected at its lower end to the transverse frame member 25 and at its upper end to the bracket member 84. The hydraulic cylinder member 89 similarly is mounted adjacent the longitudinal centerline of the apparatus, having its lower end pivotally connected to the bracket member 39 and its upper end pivotally connected to the bracket member 39 and its upper end pivotally connected to the bracket member 85. The hydraulic cylinder units 88 and 89 are operated by the power supply system 22, which will later be described.

Figure 3:
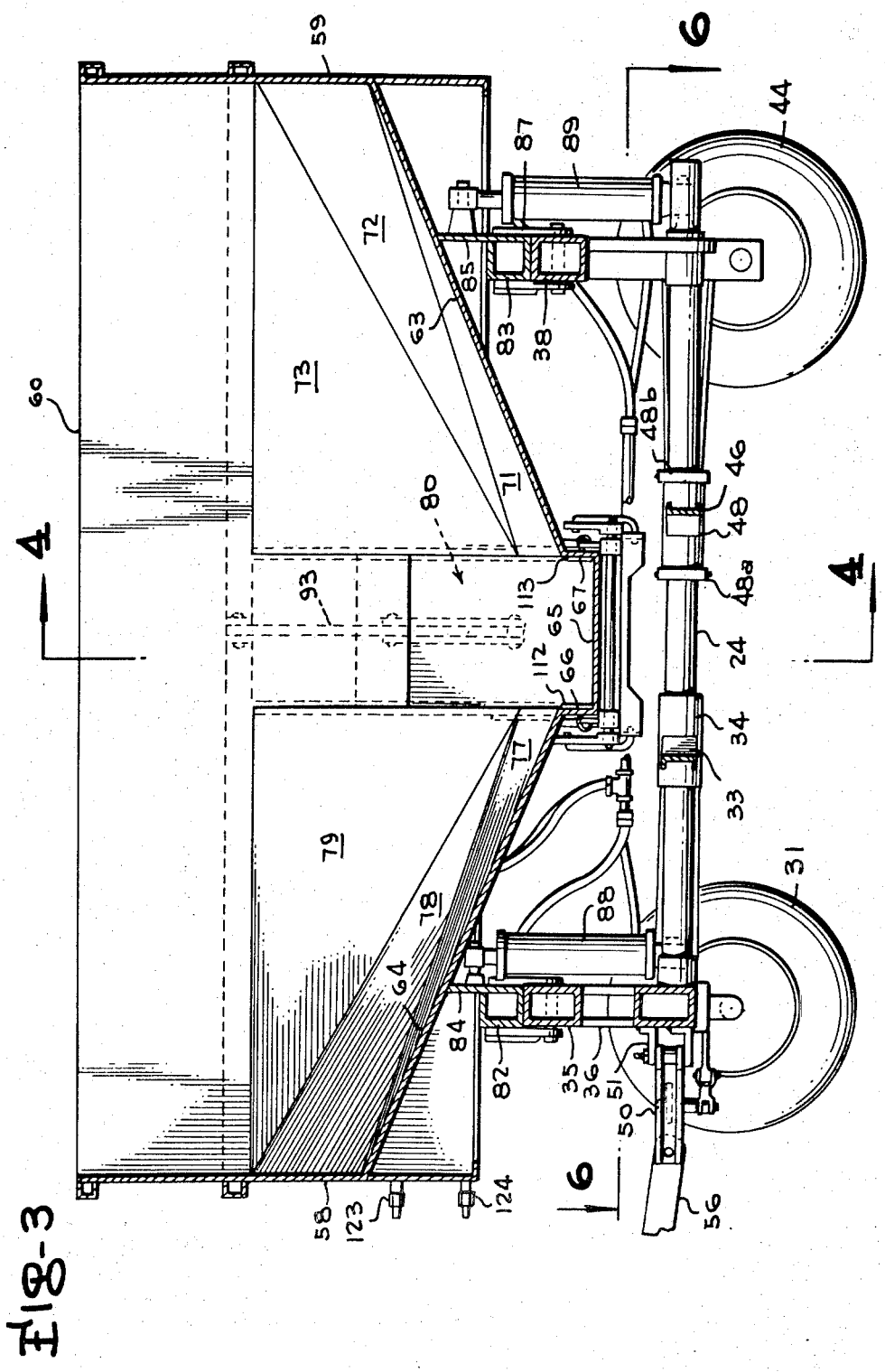
FIG. 3 is cross-sectional view taken along line 3–3 in FIG. 2.
Figure 4:
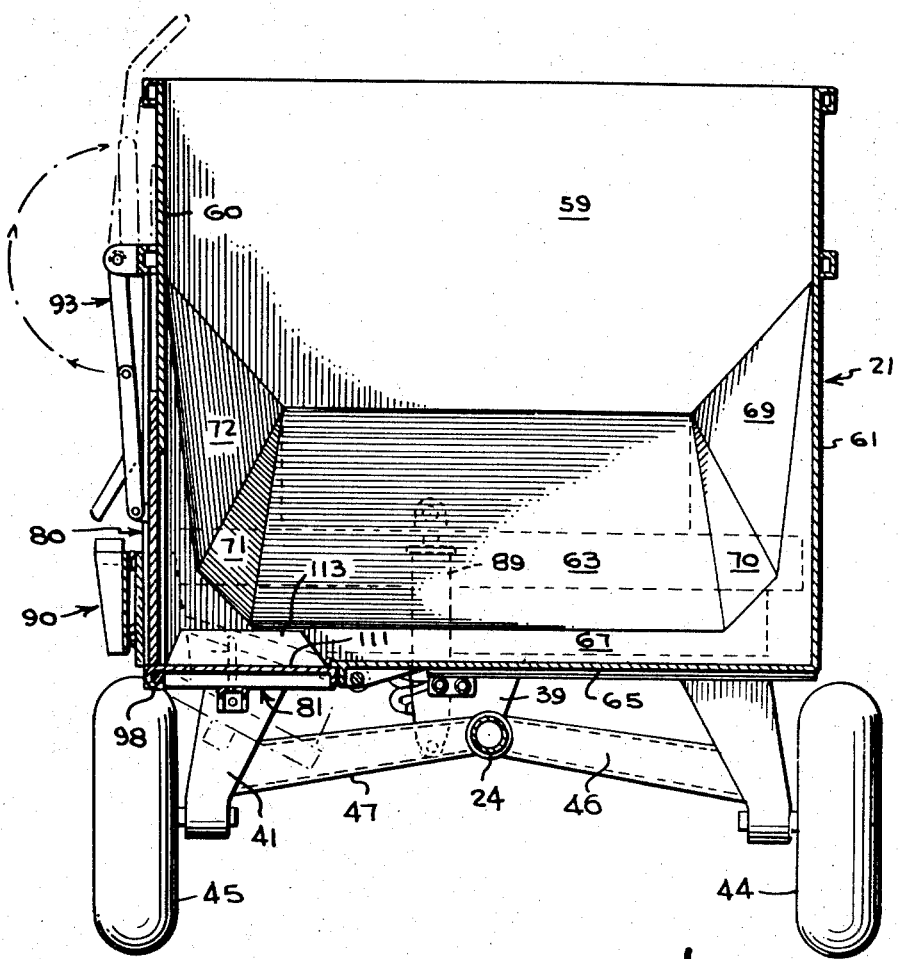
FIG. 4 is a cross-sectional view taken along line 4—4 in FIG. 3.
Figure 5:
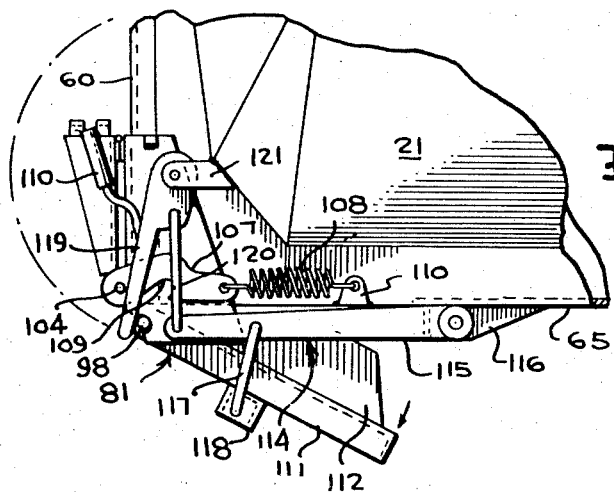
FIG. 5 is an enlarged fragmentary view illustrating portions of the side and bottom discharge door assemblies of the container unit of the embodiment.

As best illustrated in FIGS. 1, 3 and 4, the side discharge door assembly includes a pair of spaced vertical tracks 90 and 91, which vertically guide a door member 92. The door 92 is opened and closed by a hand operated mechanism 93, which includes a lower link member 94, having the lower end thereof pivotally connected to the door member 92 and the upper end thereof pivotally connected to the lower end of an upper link member 95. The upper link member 95 is pivotally connected to the side wall 60 above the door member 92. The upper link member 95 also includes a downwardly and outwardly projecting handle member 96, which is adapted to be lifted upwardly, rotating the upper link member 95 about its pivotal connection with the side wall 60, to lift and lower the discharge door member 92. The bottom wall section 62 of the container unit also is provided with a longitudinally disposed hinge pin 98, diaposed adjacent the bottom of the side discharge door assembly 80. Mounted on the hinge pin 98 is a chute member 99, having a pair of spaced side walls 100 and 101 and a bottom wall 102. The chute member comprises hinged front and rear sections 99a 99b, which permit the front section 99a to be swung downwardly and against the underside of the rear section 99b, as illustrated in FIG. 5. Suitable means are provided for retaining the sections in the position as illustrated in FIGS. 1 and 2.

The side walls 100 and 101 each are provided with a recess, as at 103, disposed toward the rear ends thereof, to permit the chute member 99 to be hooked on the ends of hinge pin 98. Disposed forwardly of the recesses 103 of the side walls 100 and 101 is a rod member 104, having the ends thereof extending beyond the side walls 100 and 101. The chute member 99 can be maintained in the operative position, as illustrated in FIG. 2, for receiving material from the interior of the container unit through the side discharge door, or in the inoperative position, as illustrated in FIG. 5, by means of similar retainer mechanisms 105 and 106. The retainer mechanism 106 includes a catch member 107 and a coil spring member 108. The catch member 107 is pivotally mounted on the rod member 104, and is provided with a recess 109 adapted to be caught on the pin 98 when the chute member 99 is in the operative position, as illustrated in FIG. 2. The coil spring member 108 is connected at one end, to the free end of the catch member 107 and is anchored at the other end to a lug 110, mounted on the container unit. When it is desired to move the chute member into the inoperative position, as illustrated in FIG. 5, the chute member is moved upwardly so that the catch members 107 are freed from the pin 98. After the catch members 107 are freed from the pin 98. After the catch members 107 are clear of the pin 98, the chute member is permitted to be swung upwardly and against the side discharge door 92 under the influence of the coil spring members 108. The front section 92a of the chute member also is swung downwardly against the underside of the rear section 99 in the position, as illustrated in FIG. 5. The chute member 99 can be moved between the operative and inoperative positions by means of a handle member 110. It also will be noted that the side walls 100 and 101 of the chute member are spaced slightly further apart than the transverse vertical walls 66 and 67 of the container unit, to permit the bottom wall 102 of the chute member to be positioned adjacent the side discharge door 92 when moved into the inoperative position. In such position, the side walls 100 and 101 will be disposed adjacent the transverse vertical wall sections 66 and 67.

The bottom discharge door assembly 81 includes a door 111 having upwardly extending side walls 112 and 113, which is hingedly connected at its outer ends to hinge pin 98. As best shown in FIG. 3, the side walls 112 and 113 are adapted to extend into the interior of the container unit through a discharge opening in the bottom wall section 65. Also, it will be noted that the spacing between the side walls 112 and 113 is slightly less than the spacing between transverse vertical wall sections 66 and 67, so that the side walls 112 and 113 are disposed adjacent the wall sections 66 and 67 when the door is in the closed position. The bottom discharge door 111 is opened and closed by means of a manually operated mechanism 114. This mechanism includes a lever arm 115 which is pivotally connected at its inner end to a bracket 116 rigidly secured to the underside of bottom wall section 65. The door 111 is carried by the lever arm 115 by means of a link member 117, connected thereto intermediate its ends, and secured at its lower end to a cross member 118 rigidly secured to the underside of the door 111. The free end of the lever arm 115 is connected to a handle member 119 by means of a link member 120. The handle member 119 is pivotally connected to a bracket 121 rigidly secured to the container unit, to permit the handle member 119 to be pivoted in a substantially vertical plane. It will be appreciated that by lifting and lowering the handle member 119 to pivot the same about its pivotal connection with the bracket member 121, the door member 111 may be opened and closed.

The embodiment includes a portable fluid motor 122, which is operatively connected to the power supply system 22 and is connectable to either attached or detached apparatus for loading and unloading material from the container unit, such as the flight conveyor 23. The power supply system 22 is of the fluid type, and is utilized to operate both the tilting cylinders 88 and 89 and the fluid motor 122. As best seen in FIG. 8, the system 22 includes a pair of connectors 123 and 124 which are adapted to be connected to a source of fluid under pressure, preferably on the prime mover means such as a tractor, a selector valve 125 which controls the supply of fluid to the tilting cylinders 88 and 89, and the fluid motor 122, and a control valve 126 which controls the flow of fluid to the tilting cylinders. The fluid circuit includes a line 127 which interconnects the connector 124 and the selector valve 125, supply and return lines 128 and 129 which interconnect the selector valve 125 and the fluid motor 122, and supply and return lines 130 and 131 which interconnect the selector valve 125 and the connector 123 with the control valve 126. Supply and return lines 128 and 129 are provided with a first set of connectors 128a and 129a located adjacent the selector valve 125, and a second set of connectors 128b and 129b located adjacent the fluid motor 122. The lower end of the cylinders intercommunicate by means of a line 132 which is connected to the control valve 126 by means of a line 133. Similarly, the upper ends of the cylinders intercommunicate by means of a line 134 which is connected to the control valve 126 by means of a line 135.

Either the set of tilting cylinders 88 and 89 or the fluid motor 122 can be operated by manipulating the selector valve 125. Also, the flow of fluid to the tilting cylinders 88 and 89 can be controlled by the control valve 126. With the valves 125 and 126 in the positions as illustrated in FIG. 8, no fluid is supplied either to the tilting cylinders or the fluid motor. The fluid simply circulates through line 127, selector valve 125, supply line 130, control valve 126 and return line 131. When it is desired to operate the fluid motor, the control handle on the selector valve 125 is turned 90°, so that fluid flows through line 127, selector valve 125, supply line 128, through the fluid motor, and is returned through return line 129, selector valve 125, line 130, control valve 126 and return line 131. In the event it is desired to operate only the tilting cylinders, the selector valve is turned to the position as illustrated in FIG. 8 and the control valve 126 is moved either to the left or the right, depending on whether it is desired to lift or lower the container unit. When the control valve 126 is moved to the left, fluid from the selector valve 125 will flow through line 130, control valve 126 and lines 133 and 132, to the lower ends of the tilting cylinders. Simultaneously, fluid will be forced from the upper ends of the cylinders through lines 134 and 135, the control valve 126 and return line 131. Under such conditions, the container unit will be tilted upwardly. By moving the control valve 126 to the right, the flow of fluid in the lines described substantially will be reversed to cause the container unit to tilt downwardly.

The output drive shaft 136 of the portable fluid motor is adapted to be operatively connected to the input drive shaft 137 of the conveyor unit 23 when the fluid motor is mounted on the mounting assembly 138 of the conveyor unit. The mounting assembly 138 comprises a bracket member 139, having a rear wall 140 and spaced side walls 141 and 142. The bracket member 139 is provided with a hinge section 143 which is adapted to be inserted between vertically spaced hinge sections 144 and 145 on the conveyor unit, and hingedly connected to the conveyor unit by means of a hinge pin 146, which is inserted through registered openings in the hinge sections 143, 144 and 145. When the bracket 139 is hingedly connected to the conveyor unit, the rear wall 140 can be swung against the side wall 147 of the container unit and retained in such position by means of a lock pin 148 mounted in a flange 149 on the side wall 142, which is biased downwardly by means of a spring 150, so that it will be received within a registered opening provided in a lug 151 mounted on the side wall 147 of the conveyor unit. The bottom edge or rear wall 140 of the bracket member is provided with a recess 152 for receiving the input shaft 137 of the conveyor unit therethrough when the mounting assembly 138 is mounted on the conveyor unit. When the output shaft 136 is operatively connected to the input shaft 137 for transmitting drive therethrough, the fluid motor 122 is positioned between the side walls 141 and 142 of the mounting assembly and is secured in such position by means of a plurality of bolts 153.

The flight conveyor unit 23 is of conventional construction, which includes a flight conveyor 154 adapted to be driven by the input shaft 137. The upper rear ends of the side walls of the conveyor unit are provided with rearwardly opening recesses 155 and 156, so that the conveyor unit can be hingedly attached to the ends of the hinge pin 98, mounted on the container unit 21. In such position, the lower end of the conveyor unit 23 is adapted to receive material from the container unit through the side discharge opening when the side discharge door 92 has been opened.

Although the portable fluid motor 122 has been described in connection with the use of a flight conveyor attached to the carrier apparatus for receiving material discharged through the side opening in the container unit, it will be understood that the portable fluid motor is intended to be used with various types of handling apparatus for loading and unloading material from the container unit. For example, the fluid motor can be used with a detached flight conveyor, which is employed for receiving material discharged through the side door onto the chute member 99 or through the bottom discharge door. In addition, the fluid motor can be used to operate a detached flight conveyor for loading material into the container unit through the open upper end thereof.

Another feature of the invention relates to the means of supporting the attached conveyor unit 23 and maintaining the same in a fixed position while tilting the container unit 21 to discharge the material through the side door onto the lower end of the conveyor unit. This means includes a cable assembly 157, as best illustrated in FIG. 7, which includes a sheave 158 mounted on the conveyor unit 23, a sheave 159 mounted in the side wall 60 of the container unit, sheaves 160 and 161 mounted on the bolster member 38 and a cable 162. The cable 162 is secured at one end to a hook 163 mounted on the end of the bolster member 83 opposite from the end adjacent the conveyor unit, reeved under and around sheaves 160 and 161, over and around sheave 159, under and around sheave 158, and is secured at its opposite end to a hook member 164 mounted on the upper end of wall member 60. With this type of cable arrangement, the container unit 21 may be lifted and lowered without disturbing the position of the conveyor unit 23.

I claim:

1. A material carrier having a container with front and rear walls, side walls and a bottom wall, each of said front, rear and side walls meeting the bottom wall at an obtuse angle, the bottom wall including wall sections inclined downwardly at either side of a central trough from said front and rear walls toward each other and of progressively increasing width to terminate at said trough whereby particulate material moving down the walls and said inclined sections can loosen as it moves toward the trough to flow freely by gravity, and door means communicating with said trough.

2. A material carrier having a container with front and rear walls, side walls and a bottom wall, the bottom wall including wall sections inclined downwardly at either side of a central trough from said front and rear walls toward each other and of progressively increasing width to terminate at said trough whereby particulate material moving down said inclined sections can loosen as it moves toward the trough to flow freely by gravity, and door means communicating with said trough, each of said side walls having a plurality of sections each of generally triangular planar shape inclined inwardly and downwardly to merge into said bottom wall sections and related one to the other to eliminate ninety-degree corners and avoid impeding the discharge of said particulate material.

* * * * *